United States Patent

Hoffman et al.

[11] Patent Number: 5,655,477
[45] Date of Patent: Aug. 12, 1997

[54] BIRD FEEDER

[75] Inventors: Esther R. Hoffman; Annemarie E. Hoffman; Dennis K. Hoffman, all of South Euclid, Ohio

[73] Assignee: Two Sisters & Their Dad, Cleveland, Ohio

[21] Appl. No.: 526,896

[22] Filed: Sep. 12, 1995

[51] Int. Cl.⁶ .................................................. A01K 39/012
[52] U.S. Cl. ................................................ 119/52.2
[58] Field of Search ....................... 119/52.2, 52.1, 119/53, 56.1, 57.4, 77

[56] References Cited

U.S. PATENT DOCUMENTS

| | | | |
|---|---|---|---|
| 1,113,842 | 10/1914 | Sill | 119/52.1 |
| 1,820,835 | 8/1931 | Sauvageau | 119/77 |
| 2,591,459 | 4/1952 | Meany . | |
| 2,598,977 | 6/1952 | Dale et al. | 119/56.1 |
| 2,874,678 | 2/1959 | Bradley | 119/52.1 X |
| 2,875,729 | 3/1959 | Gibson . | |
| 2,884,899 | 3/1959 | Jackes et al. . | |
| 3,734,061 | 5/1973 | Kraus | 119/52.2 |
| 3,780,703 | 12/1973 | Boehland, Jr. | 119/53 |
| 3,822,674 | 7/1974 | Tobin | 119/53 |
| 4,664,066 | 5/1987 | Steuernagel et al. | 119/52.2 |
| 4,712,512 | 12/1987 | Schreib et al. | 119/52.2 |
| 4,732,112 | 3/1988 | Fenner et al. | 119/52.2 |
| 4,896,628 | 1/1990 | Kadunce | 119/52.1 X |
| 5,095,847 | 3/1992 | Coffer | 119/52.2 |
| 5,123,380 | 6/1992 | Edwards | 119/57.8 |
| 5,140,945 | 8/1992 | Barnhart et al. | 119/52.2 |
| 5,309,865 | 5/1994 | Hardison | 119/57.8 |
| 5,423,291 | 6/1995 | Daugherty | 119/77 |
| 5,479,879 | 1/1996 | Biek | 119/52.2 |

Primary Examiner—Robert P. Swiatek
Assistant Examiner—Yvonne R. Abbott
Attorney, Agent, or Firm—Howard M. Cohn

[57] ABSTRACT

A bird feeder is constructed of two tubular containers attached end-to-end by a coupler threaded at opposite ends. A feed flow mechanism extends through the coupler and into both containers. Feed gravitationally flowing through the feed flow mechanism accumulates in a feed trough at the base of the lower tubular container. The amount of feed accumulating in the trough is controlled by the feed flow mechanism.

13 Claims, 2 Drawing Sheets

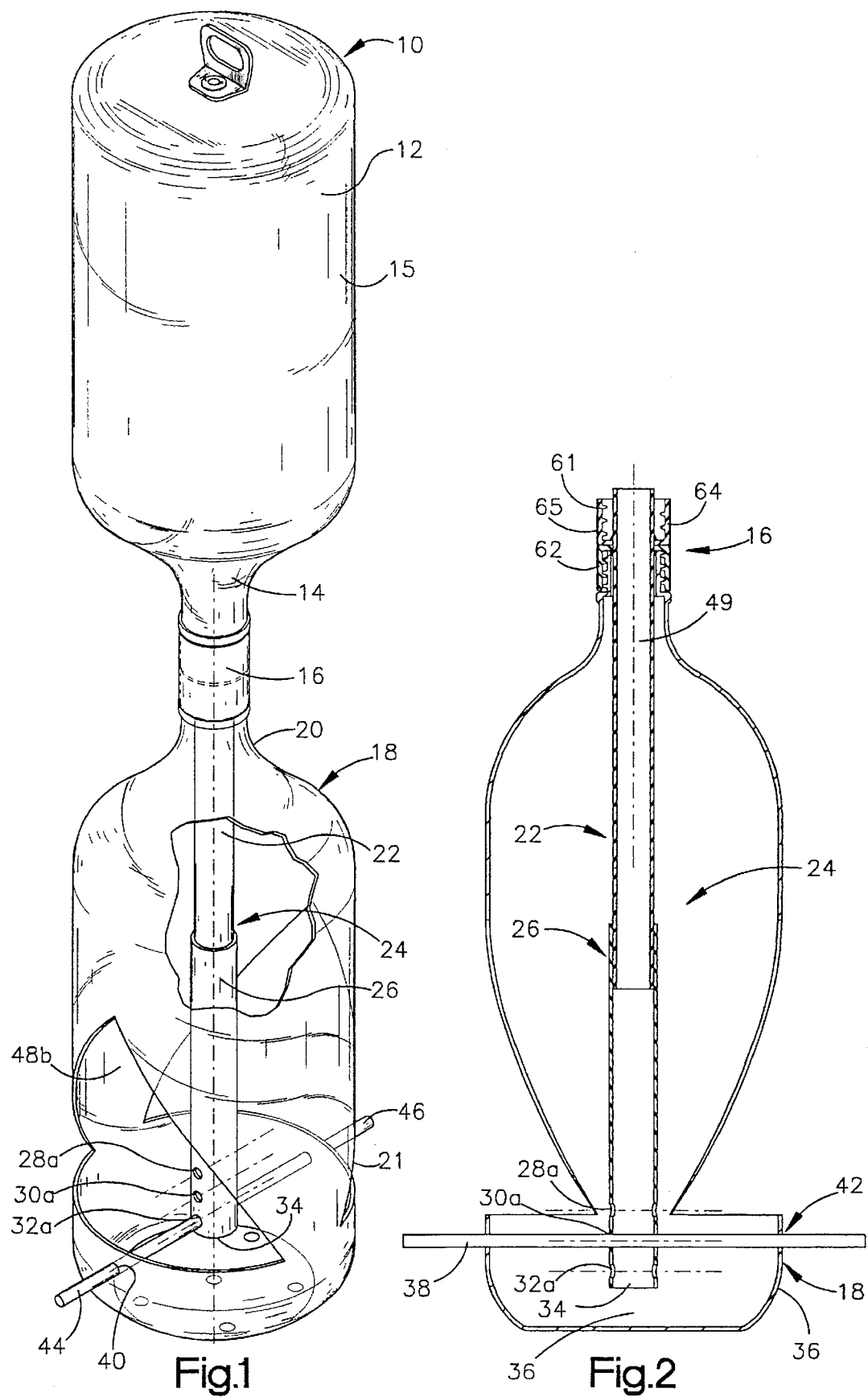

BIRD FEEDER

FIELD OF THE INVENTION

This invention relates to the field of animal husbandry and more particularly, to a device for feeding birds made primarily from recycled materials.

BACKGROUND OF THE INVENTION

Bird feeders in the prior art come in a variety of designs and are used in residential, institutional and like environments. The materials used to construct bird feeders include wood, glass, plastic, ceramic and metals. As exposure to external weather conditions ordinarily necessitates the periodic replacement of bird feeders, it is desirable to minimize the cost of such feeders.

The various shapes and sizes of feeders generally utilize one of three methods of displaying the feeder: post-mounting, cantilevering from a fixed object, or directly hanging the feeder from a fixed object. Large, heavy feeders are generally post-mounted. More common are lightweight feeders that employ one of a variety of hanging methods.

Most bird feeders hold several days supply of feed and many include both an area for feed storage and a trough from which the birds feed. Often, designs which utilize a separate storage and trough have a method by which feed is automatically discharged from the storage area to the trough as the feed in the trough is consumed. Mechanisms for controlling the dispensation of feed can make an otherwise simple design relatively expensive.

As disclosed, for example, in U.S. Pat. No. 4,712,512, disposable plastic bottles may be converted into bird feeders. A commonly used plastic bottle is the two-liter size used in the carbonated soft-drink industry. Bottles of this widely-known design are usually made by stretch blow-molding. Almost always, the upper neck portion of the bottle is threaded and engaged by a threaded closure cap which is sealed at the bottling plant to maintain carbonation of the beverage until consumption. Rather than discard these sturdy bottles once the contents have been consumed, two-liter plastic bottles may be utilized to create inexpensive bird feeders as disclosed in U.S. Pat. Nos. 4,712,512, 4,664,066, and 4,732,112.

While the prior art contains a variety of feeder designs, including those utilizing two-liter plastic bottles, it is clearly desirable to make greater use of recycled materials in the construction of bird feeders. Existing feeders which automatically dispense feed from a storage area do not give the feeder owner the ability to determine the rate at which feed is consumed. This may cause an owner to replenish the feed supply more often than he or she would prefer, with the resulting negative economic consequences. Therefore, it is also desirable to create a bird feeder with the ability to regulate the rate at which feed is dispensed.

OBJECTS AND SUMMARY OF THE INVENTION

It is an object of the present invention to provide a bird feeder that obviates the problems and limitations of the prior art systems.

It is a further object of the present invention to provide a bird feeder that makes greater usage of recycled materials than existing bird feeder designs.

It is a still further object of the present invention to provide a bird feeder which bird has the ability to regulate the rate at which bird feed is dispensed for consumption by feeding birds.

Yet another object of the present invention is to provide a bird feeder which is easy to assemble and display.

Still another object is to provide a feeder design which is quick and easy to refill with feed.

It is yet another object of the invention to provide a bird feeder which allows for the drainage of rainwater from the feed.

A further object of the invention is to provide a bird feeder from which animals other than birds are unable to consume the feed.

In accordance with the invention, there is provided a bird feeder primarily constructed of two two-liter plastic bottles, forming an upper storage container and a lower dispensing container, coupled together by two of the plastic caps produced for such bottles. A feed flow mechanism is constructed of two tubes having different diameters, the larger telescoping along the smaller. The feed flow mechanism transports feed from the upper storage container to the lower dispensing container.

Feed flow is controlled by inserting a rod through one of three pairs of opposing holes in the lower, telescoping flow tube of the feed flow mechanism. The selection of a particular pair of holes results in the aperture of the lower flow tube being held at a fixed distance from the base of the lower dispensing container. Changing this distance controls the amount of feed gravitationally flowing from the upper storage container to the lower dispensing container and the amount of feed in the feed trough section of the lower dispensing container.

The aforementioned rod also extends through opposing holes in the sidewalls of the lower dispensing container to both fix the position of the lower flow tube and serve as a perch for birds which feed from a trough formed in the base of the lower dispensing container. Access to this trough is provided by cut-out sections of the sidewalls of the lower dispensing container. Rainwater which accumulates in the feed trough is drained through holes in the base of the trough. The entire feeder construction may be displayed by attaching a wire or other hanging device to a projected surface at the top of the feed storage container.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 1 is an assembly view of the bird feeder which illustrates the feed storage container, the feed dispensing container, the feed flow mechanism, the coupler, and the perch in accordance with the invention;

FIG. 2 is a broken section view along line 2—2 of FIG. 1 showing the feed flow mechanism, the feed trough of the feed dispensing container, and positioning rod to illustrate the method for varying the amount of feed which accumulates in the feed trough section of the feed dispensing container;

DETAILED DESCRIPTION OF THE INVENTION

Figure 3:
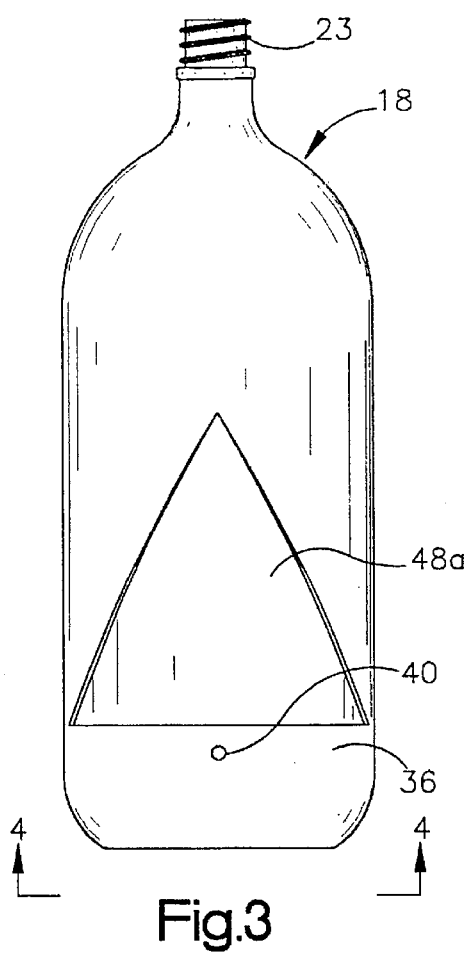
FIG. 3 is a side view along 3—3 of FIG. 2 of the feed dispensing container without a coupler or feed flow mechanism, illustrating one triangular open section in the sidewall and one hole for installation of the positioning rod.

With reference to the drawings, and particularly to FIGS. 1 and 2, a new and improved bird feeder embodying the principles and concepts of the present invention, and generally designated by the reference 10, will be described.

More specifically, it will be noted that bird feeder 10 incorporates a tubular feed storage container 12 having a discharge tube 14 at the lower end which has a smaller diameter than the main body 15 of the feed storage container 12. The discharge tube 14 has an external thread (not shown) which is threadably engaged into one end of a coupler 16. This coupler 16 joins the feed storage container 12 end-to-end with a tubular feed dispensing container 18. The upper end of the feed dispensing container 18 incorporates an inlet tube 20 having a smaller diameter than the main body 21 of the storage container 18. Inlet tube 20 has an external thread 23 (see FIG. 3) which is threadably engaged into the lower end of coupler 16. In the preferred embodiment of the invention, both the feed storage container 12 and feed dispensing container 18 are made from common plastic two-liter bottles. However, it is within the scope of the present invention to construct the containers from bottles of different sizes or shapes, such as and for example, one-liter bottles.

A feed flow mechanism 24 extends through and outward from opposite ends of coupler 16 into both feed storage container 12 and feed dispensing container 18. Feed flow mechanism 24 includes an upper flow tube 22 which extends into both feed storage container 12 and feed dispensing container 18. A lower flow tube 26 having a larger diameter than the upper flow tube 22 is movably disposed about the upper flow tube 22. As described below, the upper flow tube 22 is fixedly mounted within coupler 16 while the lower flow tube 26 is telescopically disposed about the upper flow tube 22. At least two and typically three pairs of oppositely disposed holes 28a, 28b, 30a, 30b, and 32a, 32b extend through the sidewalls of lower flow tube 26. A discharge aperture 34, located at the bottom end of lower flow tube 26, discharges feed into a feed trough 36 at the lower end of feed dispensing container 18. In the preferred embodiment, the upper and lower flow tubes 22 and 26, respectively, are constructed of plastic pipe.

A positioning rod 38 extends through one pair of oppositely disposed holes 28a, 28b, 30a, 30b or 32a, 32b in the sidewalls of lower flow tube 26 and through oppositely disposed holes 40, 42 in the sidewalls of feed dispensing container 18. Positioning rod 38 further extends outwardly from the feed trough portion 36 of dispensing container 18 to form sections adapted for use as bird perches 44, 46. Positioning rod 38 positions the discharge aperture 34 at a specified height above the base 47 of feed trough 36. In the preferred embodiment of the invention, positioning rod 38 is an ordinary wooden dowel.

A principle feature of this invention is the ability to vary the amount of feed, typically seeds of different varieties, which gravitationally flows from the feed storage container 12, through the feed flow mechanism 24, out of the discharge aperture 34, and into the feed trough 36 of the feed dispensing container 18. As illustrated by FIG. 2, lower flow tube 26 may be moved along the axis 51 extending longitudinally through the feed flow mechanism 24 and maintained in a fixed position by inserting positioning rod 38 through one pair of oppositely disposed holes 28a, 28b, 30a, 30b or 32a, 32b. The ability to select among the three pairs of oppositely disposed holes 28a, 28b, 30a, 30b or 32a, 32b allows the user to set the height of the discharge aperture 34 above the base 47 of feed trough 36. Changing the distance between the discharge aperture 34 and the base 47 controls the amount of bird feed in feed trough 36 of feed dispensing container 18. That is, the further the discharge aperture 34 is spaced from the bottom surface 47 of feed trough 36, the greater the amount of feed which is dispensed into the feed trough.

Figure 7:
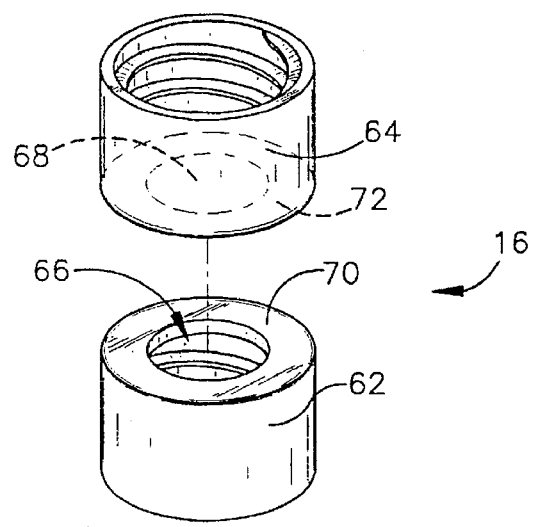
FIG. 7 is an exploded view of the coupler.

As shown in FIG. 7, the coupler 16 is a tubular cylinder 61 internally threaded at opposite ends. According to the preferred embodiment of the invention, tubular cylinder 61 is constructed of two threaded plastic bottle caps 62, 64 which have central openings 66,68 through the flat surfaces 70, 72. These caps 62, 64 are placed with respect to each other so that flat surface 70 is abutted against flat surface 72. The caps 62, 64 are securely attached together by adhesive tape 65 so that the central openings 66,68 are aligned. The upper cap 64 of coupler 16 is fixedly mounted to upper flow tube 22 by conventional means, such as for example, glue. Then, as discussed below, the feed flow mechanism 24 assembled with the coupler 16 can be threadably secured to the external thread 23 about inlet tube 20 of feed dispensing container 18.

As shown in FIGS. 1 and 3, triangular shaped open sections 48a, 48b through the sidewalls of feed dispensing container 18 create access for birds to feed trough 36. While triangular shaped openings are illustrated, it is within the scope of the present invention to provide openings with other shapes.

Figure 4:
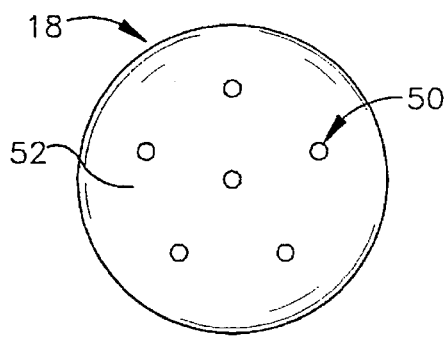
FIG. 4 is a bottom view along 4—4 of FIG. 3 of illustrating the drainage holes in the feed dispensing container.

Referring to FIG. 4, a plurality of drainage holes 50 are placed through bottom 52 of feed dispensing container 18 for drainage of rainwater from feed trough 36.

Figure 5:
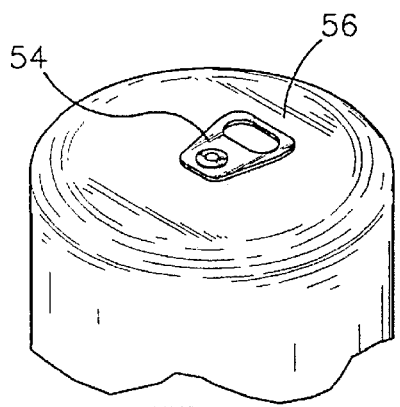
FIG. 5 is a view along line 5—5 of FIG. 1 showing the top of the feed storage container, illustrating the attachment component for hanging the bird feeder in a vertical orientation.
Figure 6:
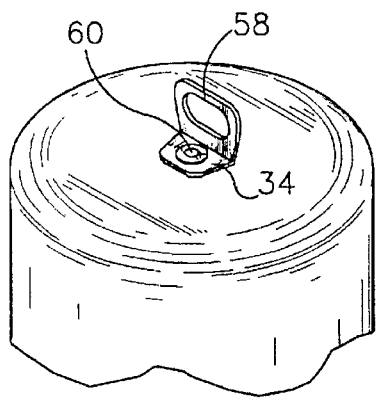
FIG. 6 is the broken view, like FIG. 5, of the top of the feed storage container, illustrating the up position of the attachment component for hanging the bird feeder.

Referring to FIG. 5, an attachment component 54 for hanging the feeder is mounted on the top surface 56 of feed storage container 12. In FIG. 5, this attachment component 54 is formed of a flat piece of material initially disposed flush against top surface 56 of storage container 12. In this position, the feed storage container 12 can be inverted to rest on the top surface 56 of the container 12 for storage purposes. FIG. 6 illustrates the attachment element 54 in the bent-up position with an attachment surface 58 projected above the top surface 56 of feed storage container 12 to enable attachment of a wire, hook, or other device for hanging of bird feeder 10. In the preferred embodiment of the invention, the attachment component 54 is made from an aluminum ring tab and is attached to top surface 56 by means of a screw 60.

Another important feature of this invention is the ability to replenish feed supply by replacing an empty feed storage container 12 with a feed storage container 12 filled with bird feed. To replace the replacement feed storage container 12, the empty container is first disengaged from coupler 16. Then, a feed storage container 12, filled with bird feed, is opened by removing a cap (not shown) threadably mounted to an external thread (not shown) on discharge tube 14. The replacement feed storage container 12 is attached to the bird feeder 10 by inserting the upper end of upper flow tube 22 of feed flow mechanism 24 into the discharge tube 14 of the storage container and then engaging the external threads of discharge tube 14 into the upper internal threads of the coupler 16. An attachment surface 58 may be positioned, as described before, to allow the bird feeder 10 to be redisplayed.

It is apparent that there has been provided in accordance with this invention a bird feeder that satisfies the objects, means, and advantages set forth hereinbefore. The bird feeder makes use of recycled materials, i.e. disposable plastic bottles, to construct a feed storage container and a feed dispensing container. The bird feeder also makes use of the plastic caps for such bottles to construct a coupler component. The bird feeder regulates the amount of feed dispensed for consumption by feeding birds with a feed flow mechanism having three rates of feed dispensation. An attachment surface used for hanging the feeder is provided by bending up one end of a ring tab mounted to the top surface of the feed storage container. Also, the free-hanging display of the feeder in combination with the tubular containers make it very difficult for animals other than birds to consume feed from the trough.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A bird feeder comprising:
   a tubular feed storage container having a main feed storage body with a discharge tube at one end, said discharge tube having a substantially smaller diameter than said main storage body;
   a tubular feed dispensing container having a main feed dispensing body and an inlet tube at a first end and an enclosed feed through at an opposite end, said inlet tube having a substantially smaller diameter then said main feed dispensing body; and
   a coupler being a cylinder that is internally threaded at opposite ends connecting said discharge tube to said inlet tube, said cylinder of said coupler comprising two threaded bottle caps having flat surfaces, each of said flat surfaces having a central opening extending therethrough, said caps securely attached together with said flat surfaces abutted against each other so that said central openings are aligned.

2. A bird feeder comprising:
   a tubular feed storage container having a main feed storage body with a discharge tube at one end, said discharge tube having a substantially smaller diameter than said main storage body;
   a tubular feed dispensing container having a main feed dispensing body and an inlet tube at a first end and an enclosed feed through at an opposite end, said inlet tube having a substantially smaller diameter then said main feed dispensing body;
   a coupler connecting said discharge tube to said inlet tube; and
   a feed flow mechanism extending through and outward from opposite ends of said coupler and into both said tubular feed dispensing container and said tubular feed storage container.

3. The bird feeder of claim 2 wherein said feed flow mechanism includes:
   an upper flow tube fixedly mounted within said coupler and extending into both said tubular feed storage container and into said tubular feed dispensing container; and
   a lower flow tube having a feed discharge aperture at a lower end thereof being disposed within said tubular feed dispensing container and telescopically disposed about said upper flow tube.

4. The bird feeder of claim 3 wherein:
   said lower flow tube has sidewalls with a plurality of oppositely disposed holes extending through said sidewalls of said lower flow tube at a location near said lower end thereof;
   said tubular feed dispensing container has oppositely disposed holes extending through a sidewall thereof; and
   a positioning rod extending through both said oppositely disposed holes in said sidewall of said feed dispensing container and a pair of said oppositely disposed holes extending through said sidewall of said lower flow tube to position said feed discharge aperture of said lower flow tube at a set distance above said feed through formed in said tubular feed dispensing container.

5. The bird feeder of claim 2 wherein said feed trough of said tubular feed dispensing container has a plurality of drainage holes extending therethrough.

6. The bird feeder of claim 2 further comprising an attachment component mounted to an end of said tubular feed storage container opposite from said one end having said discharge tube.

7. The bird feeder of claim 6 wherein said attachment component is a ring tab.

8. The bird feeder of claim 2 wherein:
   said feed storage container and said feed dispensing container are plastic bottles; and
   said feed dispensing container has one or more open sections through a sidewall thereof for access to said feed trough.

9. A feed flow assembly, comprising:
   a cylindrical coupler internally threaded at opposite ends;
   a feed flow mechanism comprising:
      an upper flow tube fixedly mounted within said cylindrical coupler; and
      a lower flow tube having a feed discharge aperture at a lower end thereof and telescopically disposed about said upper flow tube.

10. The feed flow assembly of claim 9 wherein said lower flow tube has sidewalls with a plurality of oppositely disposed holes extending therethrough.

11. The feed flow assembly of claim 10 further including:
   a tubular feed dispensing container having a main feed dispensing body with a threaded inlet tube at a first end and an enclosed feed trough at an opposite second end, said main feed dispensing body having oppositely disposed holes extending through a sidewall thereof;
   said feed flow assembly being mounted within said tubular feed dispensing container with said cylindrical coupler being threadably engaged about said inlet tube of said main feed dispensing body; and
   a positioning rod extending through both said oppositely disposed holes in said sidewall of said feed dispensing container and a pair of said oppositely disposed holes extending through said sidewall of said lower flow tube to position said feed discharge aperture of said lower flow tube at a set distance above said feed trough formed in said tubular feed dispensing container.

12. A feed dispensing assembly comprising;
   a tubular feed dispensing container having a main feed dispensing body with an inlet tube at a first end and an enclosed feed trough at an opposite second end; and
   a feed flow control mechanism comprising;

an upper flow tube extending through and outside said inlet tube of said tubular feed dispensing container and extending into said main feed dispensing body of said feed dispensing container; and a lower flow tube having a feed discharge aperture at a lower end thereof and telescopically disposed about said upper flow tube and disposed above said feed trough of said feed dispensing container.

13. The feed dispensing assembly of claim 12 wherein:

said lower flow tube has a sidewall with a plurality of oppositely disposed holes extending therethrough;

said main feed dispensing body has oppositely disposed holes extending through a sidewall thereof; and a positioning rod extends through both said oppositely disposed holes in said sidewalls of said feed dispensing container and a pair of said oppositely disposed holes extending through said sidewalls of said lower flow tube to position said feed discharge aperture of said lower flow tube at a set distance above said feed trough.

* * * * *